UNITED STATES PATENT OFFICE.

CARL W. SCHINDLER, OF NEW YORK, N. Y.

IMPROVEMENT IN HARDENING FATS AND OILS.

Specification forming part of Letters Patent No. 7,760, dated November 5, 1850.

*To all whom it may concern:*

Be it known that I, CARL WILHELM SCHINDLER, of the State, county, and city of New York, have invented a new Mode of Hardening every Kind of Fat and Oil; and I do hereby declare that the following is a full and exact description thereof.

The nature of my invention consists in imparting to every kind of fat and oil, without separating the stearine from the oleine, such a degree of hardness that it can withstand a heat of at least 135° Fahrenheit without melting, even in water heated to that degree. I obtain this in the following manner:

I take one hundred pounds of fat or oil, melt and heat it to 210° Fahrenheit. When it is heated to this temperature I add at least (in hardening oil more, according to the quality of oil) ten pounds of vegetable wax (cera-japonica,) and one pound of gum-elemi cut in small pieces, and keep it some fifteen to eighteen minutes over the fire at a heat of 210° to 220° Fahrenheit, constantly stirring it until the whole is entirely dissolved and mingled together. Let it cool down to about 178° Fahrenheit, when it is fit to be poured, molded, or cast in any form or pattern requisite, from which it is to be taken away after ten or twenty minutes, according to the warmth of the temperature, and after having entirely cooled acquires the degree of hardness above mentioned.

As the advantages of my invention will be most obvious in the manufacture of candles, I will show some of them with reference to such manufacture.

First. Any kind and any quality of fat or oil—for instance, tallow, lard, whale-oil, cocoa-nut-oil, palm-oil, rape-seed oil, spoiled butter, &c.—can undergo the process of hardening invented by me, so that in any country the cheapest of these substances may be used for that purpose.

Second. The degree of heat to which the fatty or oily substance prepared after my invention can be exposed, as above stated, is such that the product of my invention will suffer no change when fabricated in, transported to, or used in southern climates, and even in the hottest summer. Fat so often thrown away in our southern States in summer-time—spoiled butter, rancid oil—can be prepared according to my invention at any place in the South, and thereby substances can be made fit for use which otherwise would prove entirely useless.

Third. Candles made after the principle of my invention will burn longer and better, and will not run, and besides all these advantages they will be comparatively cheap.

One hundred pounds of common tallow candles made after the most approved manner in our factories will cost eight dollars.

| | |
|---|---:|
| 100 pounds of tallow at 7½ cents per pound costs | $7 50 |
| The manufacture costs | 50 |
| | $8 00 |

The cost of one hundred and ten pounds of candles made after my improved invention is the following:

| | | |
|---|---:|---:|
| 100 pounds of tallow | | $7 50 |
| 10 pounds of cera-japonica | $1 00 | 1 10 |
| 1 pound of gum-elemi | 10 | |
| Manufacturing | | 50 |
| | | $9 10 |

The cost of one pound of these is therefore eight and three-tenths cents, while that of common tallow candles is eight cents, and the former are worth at least four to five cents per pound more than the latter. In case a poorer quality of fat or oil is used, the cost of the production of candles is still lessened. Five cents would be the highest price to be given for a pound of such substances. The highest cost of one hundred and ten pounds of candles made of these would therefore be six dollars and sixty cents, or six cents a pound, for which a good-looking candle may be made, which burns as well in any, even the hottest, climate, and which is at least two cents per pound cheaper than the commonest of tallow candles.

I transmit herewith specimens of tallow and lard for one candle of each, and also of the ingredients of cera-japonica and gum-elemi in the proportion requisite to make the two candles, one of tallow and the other of lard; and I also transmit two candles made after my invention out of the very same substances and the mold and wicks used for them; also, one piece of common tallow, prepared after my invention some four weeks ago, is joined to show that the product of my invention gets harder and better the longer it be kept.

What I claim as my invention, and desire to secure by Letters Patent, is—

The hardening of fatty or oily substances, without separating the stearine from the oleine, to such a degree that they can withstand a heat of at least 135° Fahrenheit without melting, using for that purpose the ingredients of cera-japonica and gum-elemi, in the manner and proportions above described, which will produce the intended effect.

CARL WILHELM SCHINDLER.

Witnesses:
HERMANN E. LUDWIG,
CHARLES HENRY SMITH.